Dec. 22, 1959  C. M. THOM  2,918,130
MACHINE FOR FORMING HOLES IN COMPACTED LAWN SOIL
Filed April 2, 1956  3 Sheets-Sheet 1
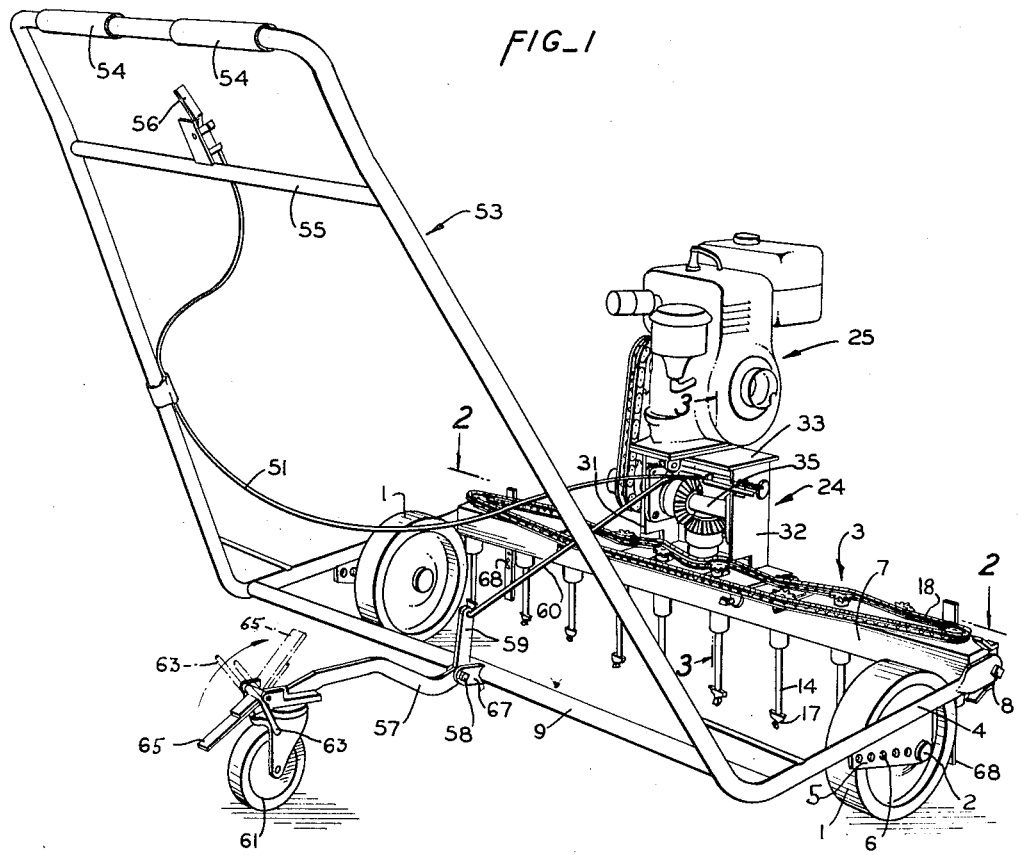
INVENTOR.
CLARENCE M. THOM
BY
Boyken, Mohler & Wood
ATTORNEYS Dec. 22, 1959     C. M. THOM     2,918,130
MACHINE FOR FORMING HOLES IN COMPACTED LAWN SOIL
Filed April 2, 1956     3 Sheets-Sheet 2
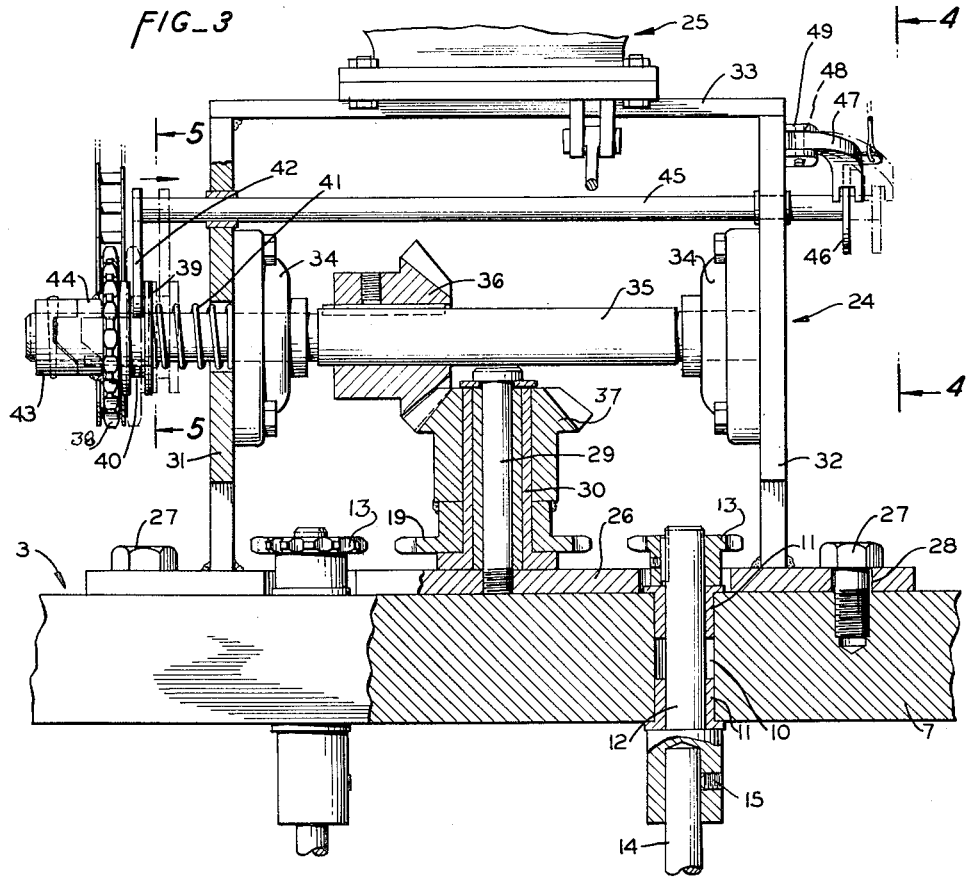
INVENTOR.
CLARENCE M. THOM
BY
ATTORNEYS Dec. 22, 1959          C. M. THOM          2,918,130
MACHINE FOR FORMING HOLES IN COMPACTED LAWN SOIL
Filed April 2, 1956          3 Sheets-Sheet 3
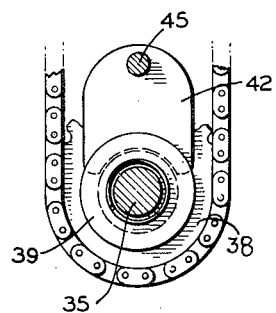
FIG_5
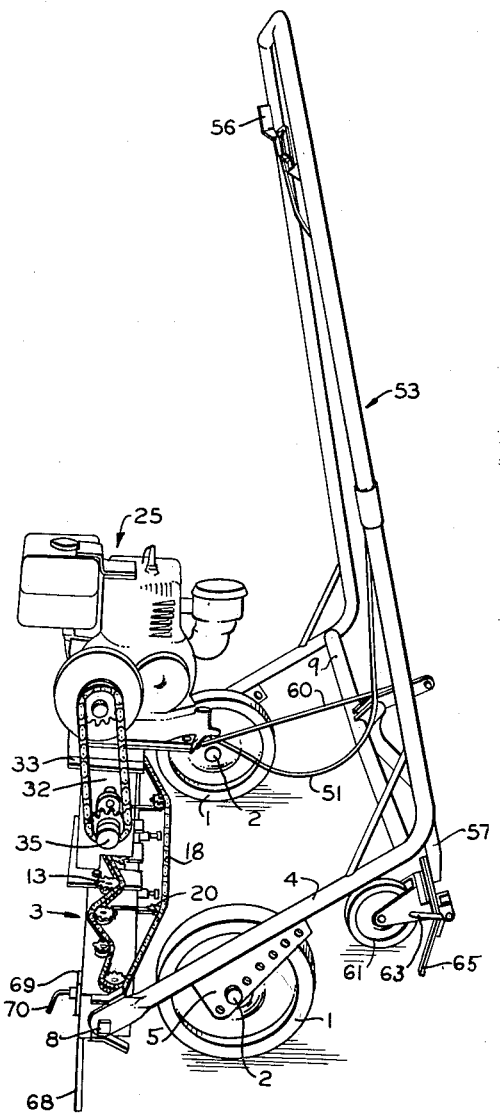
FIG_6
INVENTOR.
CLARENCE M. THOM
BY
ATTORNEYS United States Patent Office 2,918,130
Patented Dec. 22, 1959

2,918,130

MACHINE FOR FORMING HOLES IN COMPACTED LAWN SOIL

Clarence M. Thom, Calistoga, Calif.

Application April 2, 1956, Serial No. 575,509

7 Claims. (Cl. 172—22)

This invention relates to a machine for forming holes in the compacted surface soil of a lawn.

It is recognized that one of the failures in lawns is the fact that the surface soil becomes hard and compacted so that neither the water from sprinklers nor fertilizer will reach the roots. Attempts to remedy this condition have been made by the procedure known as "spiking the lawn," or by punching holes in the hard surface soil which enables water and fertilizer to get below the surface of the soil, and in some instances the holes formed may be filled with sand or a soil lightener which may include a fertilizer.

The most primitive implements heretofore used for "spiking" a lawn have been hand wielded forks or spikes, which have been effective to a degree, but uniformity of result has been lacking since the holes are not uniformly distributed and lack uniformity in depth. Apart from these objections, the severe labor required by the operator and the slowness of the operation made the procedure unpopular.

Attempts to improve uniformity of spiking and to make the operation easier and faster resulted in wheels or drums adapted to be rolled over the lawn, which wheels or drums were provided with radially outwardly projecting spikes. This form of spiker soon lost favor due to the fact that the roots of the grass were torn out of the ground and the soil was further compacted by the spike supports.

Further developments included the provision of reciprocating spikes to avoid tearing the roots.

The attempts to spike a lawn by punching holes in the surface soil have resulted either in further compacting the soil at the sides of the holes or in pulling chunks of soil out of the ground with the spikes, or in tearing out grass roots over an area around each spike many times the diameter of each spike.

Many sandy loam soils have a substantial percentage of sand and, if disintegrated, will not readily pack again for a relatively long period of time.

One of the objects of the present invention is the provision of means for quickly and effectively drilling holes in the compacted surface soil without further compacting the soil at the sides of the holes and at the same time breaking up the compacted soil removed to form the holes so that such soil may be used to fill the holes where the sand content is such as to make it desirable to do so.

A still further object of the invention is the provision of means for drilling holes in a lawn to any desired uniform depth with the least amount of exertion on the part of the operator and with the least amount of injury to the roots of grass and without tearing up the soil and roots around the holes.

Other objects and advantages will appear in the description and in the drawings.

In the drawings, Fig. 1 is a perspective view of a machine for carrying out the invention and method.

Fig. 2 is a plan view of part of the machine as seen from line 2—2 of Fig. 1.

Fig. 3 is an enlarged fragmentary sectional view of the connection between the drill driving motor and the drills, as seen from line 3—3 of Fig. 1.

Fig. 4 is a fragmentary side elevational view of part of Fig. 3 as seen from line 4—4 thereof.

Fig. 5 is a fragmentary sectional view as seen from line 5—5 of Fig. 3.

Fig. 6 is a perspective view of the machine of Fig. 1 when swung to an inoperative position for storage.

In the following description the words "forward," "forwardly," "front," "rear," "rearwardly" or words of similar import are used with respect to the direction of movement of the machine. The "leading" end of the machine in normal use is the front or forward end and the trailing end is the rear end.

In the machine illustrated there is a pair of coaxial ground wheels 1, which wheels preferably have flat treads so as not to injure the grass. These ground wheels are supported for rotation on axles 2, which axles may be individual axles, as illustrated, or through axles.

A carriage, generally designated 3, includes parallel opposed side frame members 4 having depending brackets 5 that may each be formed with a generally horizontally extending, but slightly upwardly inclined (from front to rear) row of spaced openings 6 to provide for different positions of the axles 2 relative to the front and rear ends of the machine. When the axles are in the more elevated axially aligned openings, the carriage will, of course, be closer to the ground than when the axles are in the lower openings. The adjustment enables the operator to adapt the machine to his or her individual preferences.

A drill support 7 forms the forward side of the carriage. This support extends at its ends past the forward sides of the wheels 1 and the side frame members 4 extend past the oppositely outwardly facing sides of the pair of wheels 1 for connecting to the ends of the support 7 by means of coaxial horizontal pivots 8. A cross bar 9 forms the rear side of the carriage and extends between the rear ends of frame members 4.

This support 7 is preferably a solid bar so as to provide substantial weight so that the drills carried thereby may drill into the ground solely under the influence of gravity.

As seen in Fig. 3, the support 7 is formed with vertical through holes 10 adapted to carry bushings 11 that, in turn, rotatably support the upper end portions of drill chucks 12 with the upper and lower ends of said chucks projecting above and below support 7.

A sprocket wheel 13 is keyed to the upper end of each chuck 12, and a vertical drill 14 is releasably secured in the lower end of each chuck by means of a set screw 15 or any other suitable means. By this structure each chuck and drill secured therein may be considered as a unit and they are so considered in some of the claims.

Each drill may consist of a straight shank having a cutting bit 17 of relatively hard steel at its lower end, the bit being twisted for upward movement of the soil cut by said drill as it is rotated and moved downwardly into the ground. Obviously a full twist drill could be used, but the above form is preferable since only the cutting end need be of quite hard steel, and alternate bits in the row have a reverse twist with respect to the bits adjacent thereto.

The drills supported by bar 7 may be in a straight row extending longitudinally of the bar or some may be offset slightly relative to others. In any event, they are substantially in a row extending longitudinally of the bar, and an endless horizontally disposed sprocket chain 18 has a forward run in engagement with the teeth of the sprockets 13, which chain extends around the end sprockets in the row and then alternately past the front and rear sides of the adjacent sprockets in said row except at the center of the row where the chain engages the teeth of a drive sprocket 19 that is positioned between the middle pair of sprockets 13 (Fig. 2). At this point the chain 18 extends past the forward sides of the middle pair of sprockets 13 and past the rear side of drive sprocket 19, the latter extending slightly between the middle pair of sprockets 13 to insure engagement of a plurality of the teeth of sprocket 19 with the links of the chain. Thus the forward run of chain 18 preferably weaves back and forth between sprocket wheels 13 and also the alternate sprockets at opposite sides of sprocket 19 will rotate in directions opposite to the sprockets therebetween.

The foregoing arrangement is quite desirable since it insures a positive drive to all sprockets under circumstances, such as the striking of a rock or hard obstacle by one or more of the drills, which would tend to throw the chain off the sprocket, and also the torque of the drills is equalized at each of the opposite ends of the support 7.

The rear run of chain 18 extends rearwardly past and in engagement with idler sprockets 20 that are carried on brackets 21, the latter being supported on the support 7 for movement rearwardly and for locking in adjusted positions by stud bolts 22. Slots 23 in brackets 21 permit said movement of the brackets. These sprockets 20 are chain tighteners that enable tightening the chain 18.

Centrally between the ends of support 7, and above the latter, is an engine or motor mount 24 (Fig. 3) that carries an engine 25 (Fig. 1) and the power transmission elements and clutch for driving the drive sprocket 19.

The motor mount illustrated comprises a plate 26 (Fig. 3) secured on support 7 by stud bolts 27 extending through slots 28 (Fig. 2) in said plate. These slots extend transversely of the support 7, thus permitting forward and rearward adjustment of the motor mount and of the drive sprocket 19 since this sprocket is carried by the motor mount for movement therewith (Fig. 3). This adjustment of the motor mount and sprocket 19 enables the latter to also function as a chain tightener.

A vertical shaft 29 is secured to plate 26 of the motor mount and a bearing bushing 30 on said shaft rotatably carries the sprocket 19 with said sprocket in the same horizontal plane as that in which sprockets 13 are positioned.

The plate 26 is formed with rearwardly opening slots 80 (Fig. 2) in which the central pair of sprockets 13 are positioned. Thus the motor mount and sprocket 19 may be removed from the supporting bar 7 without disturbing the chain 18.

Motor mount 24 also includes vertical, opposed side plates 31, 32 that are spaced apart in direction longitudinally of the support 7, and a horizontal top plate 33 connects the upper ends of the plates 31, 32. The motor or engine 25 is carried on the top plate 33, being bolted thereto.

Coaxial bearings 34 (Fig. 3) carried by the side plates 31, 32 rotatably support a horizontal shaft 35, which shaft has a bevel gear 36 secured thereto at a point between said side plates. This gear 36 has its teeth in mesh with the teeth of a bevel gear 37 that, in turn, is secured to sprocket 19, coaxial therewith, and is rotatable on shaft 19.

One end of shaft 35 extends through the plate 31 and projects from the outer side of the latter.

Slidably and rotatably supported on the projecting end of shaft 35 is a sprocket wheel 38 that has a hub 39 thereon, which hub is disposed between the wheel 38 and plate 31 that is adjacent thereto. The hub is formed with a radially outwardly opening channel 40 for receiving the arcuate side of a member 42 (Figs. 3, 5) therein.

On the outer end of shaft 35 and rigid therewith is one element 43 of a dog clutch, the other element 44 thereof being on the sprocket wheel 38. Upon axial movement of sprocket wheel 38 on the projecting end of shaft 35 in direction away from the clutch element 43, the sprocket wheel will be disengaged from said clutch element and will be freely rotatable on the shaft 35. An expansion, helical spring 41 on the shaft 35 between the hub 39 and the inner race of bearing 34 yieldably urges the sprocket wheel and clutch element 44 in direction toward the clutch element 43 and into engagement with the latter except when the member 42 is moved to disengage clutch element 44 from the element 43.

A rod 45 connected with the member 42 slidably extends through registering openings in side plates 31, 32 and projects outwardly of plate 32 at the end that is opposite to member 42. The end so projecting from plate 32 carries a head 46 (Fig. 3) that is engaged by one end of an arm 47 that is pivoted at 48 at its opposite end to a bracket 49 (Fig. 4) that is rigid with the plate 32.

Adjacent to the bracket 49 is a plate 50 rigid with the side plate 32 and extending rearwardly of the latter and the end of the sheath 51 of a Bowden cable is secured to said plate at a point spaced from the arm 47. The movable wire 52 in said cable extends to and is connected with the arms 47 (Fig. 4). Thus, upon pulling wire 52 rearwardly, the arm 47 will be swung to cause shaft 45 to move axially in a direction for disengaging the clutch element 44 from element 43. When the wire 52 is released, the spring 41 will cause the said elements to be automatically engaged.

Engine 25 is preferably a governor controlled constant speed engine, although the speed can be increased or decreased by adjusting the governor. In normal operation with the engine running the drills will be rotated as long as the clutch elements interengage with each other, and the drills will stop when the clutch elements are disengaged.

In rearward and upward continuation of the side elements 4 of the carriage are the side members 53 of a handle that has a hand gripping bar at the rearmost end thereof provided with a pair of hand grips 54. Adjacent to the hand gripping bar is a cross member 55 to which the end of the sheath of cable 51 is secured. An operating lever 56 connected with wire 52 of the cable 51 is adjacent to cross member 55 where it is readily accessible to a hand of the operator for actuation of the clutch.

Intermediate the ends of the rear cross bar 9 or rear side of the carriage 3 are spaced ears 67 between which an arm 57 extends, and a horizontal pivot 58 connects said arm with said ears. The forward end portion 59 of said arm extends upwardly, and a connecting rod or link 60 extends from the upper end of portion 59 to the top plate 33 of the motor mount 24. The ends of said link or rod are respectively connected by horizontal pivots with the upper end of portion 59 and with ears rigid with the motor mount.

The portion of arm 57 that extends rearwardly from pivot 58 carries a caster ground wheel 61 that is swingable about a vertical pivot connecting it with the rear end of arm 57.

The rear end of arm 57 extends over wheel 61 and the pivoted mounting for said wheel, and said rear end carries a generally U-shaped member 63, the closed end of which is pivotally carried by the rear end of arm 57 for swinging of the sides of said member from the full line position (Fig. 1) at opposite sides of wheel 61 to the dot-dash position 64. A flat arm 65 rigid with the closed end of the U-member is adapted to be engaged by the foot of the operator for swinging said arm from the full line position in Fig. 1 to the dot-dash position 66 for so swinging the sides of the U-member 63 to the position 64 of the latter.

When the machine is set to move forwardly in a straight line, the sides of the U-member 63 are at opposite sides of the wheel 61 to prevent the swinging of said wheel about a vertical axis, but when the machine is to be turned, the U-member is swung upwardly to free the wheel 61 so it can turn about its vertical axis.

The elevation of drills 14 above the ground is accomplished by swinging the handle 53 downwardly, and with the machine illustrated, the carriage 3 is so counterbalanced by the weight at the forward and rear sides of the axis of wheels 1, that only approximately a five to ten pound force is required to so elevate the drills even though the weight of the motor and bar 7 and drills exceed several hundred pounds. Since the greater weight is forwardly of the axles 2, the forward portion of the carriage will automatically swing downwardly and the drills will cut holes in the compacted surface soil under the influence of gravity.

The linkage that includes the arm 57 and connecting rod 60 is arranged to maintain the drills 14 substantially vertical while they go into the ground and while they are withdrawn from the ground, and this arrangement, as illustrated, prevents the making of undesirably large holes in the ground.

In order to regulate the depth of cut of the drills, a pair of vertically adjustable feet 68 are provided at the front forward sides of the support 7 and adjacent to the ends thereof. These feet comprise vertically elongated strips each of which is vertically slidable in a recess formed in the front side of the support, the open side of the recess being covered by a plate 69 (Fig. 2) through which an adjusting screw 70 extends for engagement with each foot 68 to lock the latter in vertically adjusted position. When the lower ends of the feet engage the ground, the drills can go no deeper, hence the vertical adjustment of the feet regulates the depth of the holes that are formed.

In operation, when the motor or engine 25 is running and the clutch is engaged so that the drills are rotating, the operator will permit the drills to form a row of holes by merely removing downward pressure on the handle 53. If the ground is extremely hard, the cutting can be expedited, if desired, by effecting a slight upward force on the handle. As soon as the drills have cut as far as permitted by the feet or stop means 68, the operator will elevate the drills from the ground by swinging handle 53 downward and will move the machine forwardly to the new position. The depth of each hole is usually from three to five inches with a diameter of approximately one-half inch, and the spacing between drills is preferably between five and six inches. With said device the normal operator is able to drill over twenty-thousand holes spaced approximately five inches apart in about two and one-half hours and without severe physical exertion.

The position of the vertically positioned and vertically movable drills at the leading end of the machine closely adjacent to the foremost surface of the latter, and ahead of the wheels and frame, enables the drills to form holes in the ground next to trees, walls, sidewalks, sprinklers, curbs etc., which would be impossible if the wheels or frame were to project forwardly of the drills.

In the operation, where the soil is hard and dry, the soil removed from the hole is disintegrated, hence is suitable for refilling the holes, and if the sand content is sufficiently high, the soil will not pack again for a considerable time. As seen in Fig. 1 the end drills of the row thereof are ahead of the wheels 1 and relatively close to the laterally outermost surfaces of the machine, which are the oppositely outwardly facing surfaces of the pair of side frame members 4 (Fig. 1, 2). Thus the drills are not only capable of drilling close to trees and walls that are ahead of the machine, but the end drills of the row are so positioned that they will drill close to trees, walls, curbs, hedges and the like that are along either side of the machine.

The invention is not to be considered restrictive to the precise structure as described, but any modifications are included that come within the scope of the claims.

I claim:

1. A lawn conditioning machine for making holes in the compacted surface soil in a lawn comprising: a plurality of vertically extending, spaced, rotary drills having cutting edges at their lower ends, a support carrying said drills for rotary movement of the latter with the drills depending from said support and with their cutting edges in a common substantially horizontal plane, coaxial ground wheels for said support offset to one side of the latter and supported for rotation on a common axis, support mounting means rotatably connected with said wheels on their axes extending to said support and coaxial pivots connecting said support mounting means with said support for carrying said support by said wheels and to enable generally vertical oscillatory movement of said support about the axis of said wheels and to further enable rotary movement of said support relative to said support mounting means about said coaxial pivots whereby said drills may have a substantially reciprocatory movement upon oscillating said support, support oscillating means connected with said support mounting means for effecting said oscillatory movement of said support, and means connecting said support oscillating means with said support for holding said support and drills in a position with said drills substantially vertical during said oscillatory movement, said support mounting means holding said support in a position with the cutting edges of said drills spaced above the ground where said support is at the upper end of its oscillatory movement and supporting said support and drills for movement of said drills into the ground when said support is at the lower end of its oscillatory movement, and means connected with said drills for rotating them simultaneously during said oscillatory movement of said support.

2. A lawn conditioning machine for making holes in the compacted surface soil in a lawn comprising: a plurality of substantially vertically extending spaced rotary drills having ground cutters at their lower ends, a support carrying said drills at their upper ends for rotary movement thereof with the lower end portions of said drills depending from said support and with said cutters disposed in a substantially horizontal plane, coaxial ground wheels for said supports supported for rotation about a horizontal axis, a carriage extending transversely of said axis to opposite sides thereof and pivotally connected with said wheels on their axes, counterbalancing means on said carriage at opposite sides of said axis substantially counterbalancing said carriage at said opposite sides with slight overbalance at one side, said counterbalancing means at said one side of said axis being relatively close to said axis as compared with the counterbalancing means at the other side of said axis and the counterbalancing means at said one side including said drill support and said plurality of substantially vertical spaced rotary drills carried thereby, means connected with said drills for rotating them simultaneously, the counterbalancing means at said other side of said axis including a handle projecting away from said axis adapted to be manually grasped for pushing said carriage in direction normal to said axis and for swinging said carriage about said axis for moving said drills into and out of the ground upon moving said handle up and down, a trailing ground wheel at said other side of said axis and spaced a substantial distance from said axis, said carriage further including coaxial pivots mounting said support in said carriage for movement of said support about an axis parallel with and spaced from the axis of said ground wheels, means pivotally connecting said ground wheel with said other side of said carriage and with said support for holding said support in a position with said drills substantially vertical upon swinging said carriage about the axis of rotation of said ground wheels.

3. A lawn conditioning machine comprising; a horizontally extending drill support having a horizontally extending row of vertically disposed drills depending therefrom with said drills substantially equally spaced from each other, and with said row extending longitudinally of said support, means mounting said drills on said support for rotation of said drills about their vertical axes, sprocket wheels respectively on the upper ends of said drills, an endless sprocket chain in engagement with and extending longitudinally of said support and around the sprocket wheels that are on the end drills of said row, a length of said chain extending alternately across and in engagement with one of the opposite sides of the sprocket wheels on drills positioned between a midpoint on said support and each end thereof for rotating the alternate drills on each half of said support oppositely when said length is moved longitudinally in one direction, a power sprocket wheel carried by said support substantially at said midpoint in engagement with said chain, and a motor also carried by said support substantially at said midpoint and over said support connected with said power sprocket wheel for driving the latter in one direction to thereby cause said opposite rotating of said drills, a generally U-shaped handle connected at its free ends to the ends of said support and projecting laterally a substantial distance to one side of the latter with the closed outer end of the said handle elevated above the level of said support for grasping by the hands of an operator, a pair of coaxial ground wheels supporting said support for movement of said support and drills over the ground, and axles supporting said wheels for rotation about an axis parallel with the longitudinal axis of said support, said axles being carried by the portions of said handle adjacent to their said free ends at points offset to the side of said support to which said handle extends whereby vertical oscillatory movements of said closed end of said handle will cause generally vertical oscillatory movement of said support for moving said drills into and out of the ground, said wheels supporting said support in a position with the lower ends of said drills relatively close to the ground when the closed end of said handle is in a position for movement of the support over the ground.

4. A lawn conditioning machine comprising; a horizontally extending drill support having a horizontally extending row of vertically disposed drills depending therefrom with said drills substantially equally spaced from each other and with said row extending longitudinally of said support, means mounting said drills on said support for rotation of said drills about their vertical axes, sprocket wheels respectively on the upper ends of said drills, an endless sprocket chain in engagement with and extending longitudinally of said support and around the sprocket wheels that are on the end drills of said row, a length of said chain extending alternately across and in engagement with one of the opposite sides of the sprocket wheels on drills positioned between a midpoint on said support and each end thereof for rotating the alternate drills on each half of said support oppositely when said length is moved longitudinally in one direction, a power sprocket wheel carried by said support substantially at said midpoint in engagement with said chain, and a motor also carried by said support substantially at said midpoint and over said support connected with said power sprocket wheel for driving the latter in one direction to thereby cause said opposite rotating of said drills, a generally U-shaped handle connected at its free ends to the ends of said support and projecting laterally a substantial distance to one side of the latter with the closed outer end of the said handle elevated above the level of said support for grasping by the hands of an operator, a pair of coaxial ground wheels supporting said support for movement of said support and drills over the ground, axles supporting said wheels for rotation about an axis parallel with the longitudinal axis of said support, said axles being carried by the portions of said handle adjacent to their said free ends at points offset to the side of said support to which said handle extends whereby vertical oscillatory movement of said closed end of said handle will cause generally vertical oscillatory movement of said support for moving said drills into and out of the ground, said wheels supporting said support in a position with the lower ends of said drills relatively close to the ground when the closed end of said handle is in a position for movement of the support over the ground, means supporting said motor and said power sprocket wheel for movement of said power sprocket different distances toward said chain whereby said power sprocket wheel will function as a chain tightener.

5. A lawn conditioning machine comprising: a horizontally extending drill support having a horizontally extending row of vertically disposed horizontally spaced drills depending therefrom, means mounting said drills on said support for rotation of said drills about their vertical axes, power means carried on said support connected with upper ends of said drills for simultaneously rotating the latter, a generally U-shaped handle connected at its free ends with the ends of said support and projecting laterally a substantial distance to one side of the latter with the closed outer end of the said handle elevated above the level of said support for grasping by the hands of an operator, a pair of coaxial ground wheels supporting said support for movement of said support and drills over the ground, axles supporting said wheels for rotation about an axis parallel with the longitudinal axis of said support, means on the portions of said handle adjacent to said support for supporting said axles at different horizontal distances from said support at the side of the latter to which said handle projects and at different vertical distances from said support whereby the distance of the said drills from the ground may be varied and whereby vertical oscillatory movement of said closed end of said handle will cause generally vertical oscillatory movement of said drills to move said drills into and out of the ground, and means depending from said support for engaging the ground after penetration of said drills into the ground to limit the distance said drills will enter the ground, and means for securing said last mentioned means to said support at different heights to enable varying said last mentioned distance.

6. A lawn conditioning machine comprising; a horizontally extending drill support having a horizontally extending row of vertically disposed horizontally spaced drills depending therefrom, means mounting said drills on said support for rotation of said drills about their vertical axes, power means carried on said support connected with the upper ends of said drills for rotating the latter simultaneously, a generally U-shaped handle, pivot means connecting the free ends of said handle with the ends of said support for rotation of said support and handle relatively about an axis parallel with the longitudinal axis of said support, said handle extending laterally from its free ends to one side of said support for a substantial distance with the closed outer end of said handle elevated above the level of said support for grasping by the hands of an operator, a pair of coaxial ground wheels supporting said support for movement of the latter and said drills over the ground, axles supporting said wheels for rotation about an axis parallel with said longitudinal axis of said support, and means on the end portions of said handle adjacent to said support for supporting said axles on said end portions at points between said support and said closed end of said handles whereby vertical oscillatory movement of the closed end of said handle will cause similar oscillatory movement of said support and drills, and means connecting said support with said handle actuatable by said oscillatory movement of said handle for effecting relative rotation between said handle and said support about said pivot means for holding said support in a position with said drills vertical during said oscillatory movement of said support whereby the movement of said drills will enter and leave the ground substantially vertically upon said vertical oscillation of said handle and support.

7. In a lawn conditioning machine having a leading end and a trailing end and a pair of coaxial ground wheels supporting the same for movement over the ground with said leading end foremost and with said trailing end rearmost; a horizontally elongated drill support at said leading end disposed forwardly of said wheels relative to said trailing end and parallel with their common axis, a rigid frame extending between said leading end and said trailing end pivotally connected with the opposite ends of said drill support for rotary movement of the latter relative to said frame about an axis parallel with said common axis, said frame including manually engageable means at said trailing end adapted to be grasped by the hands of an operator for manipulating said frame, a plurality of spaced, rotary drills substantially in a row extending longitudinally of said drill support, means rotatably supporting said drills at their upper ends on said support, power means connected with said drills for rotating them simultaneously, horizontal pivots coaxial with the common axis of said wheels supporting said frame on said wheels at points spaced between said drill support and said manually engageable means for swinging said drill support and drills generally vertically as a unit from an elevated position in which said drills are spaced above the ground to a lowered position in which said drills are a predetermined distance in the ground, and vice versa, upon said manually engageable means being swung vertically between a raised position and a lowered position, and means pivotally connected with said frame and support actuatable for movement upon so swinging said support for holding the latter in a position in which said drills are vertical during said movement between said elevated and said lowered position.

References Cited in the file of this patent
UNITED STATES PATENTS

| | | |
|---|---|---|
| 1,600,663 | Barrowman | Sept. 21, 1926 |
| 1,878,442 | Hamshaw | Sept. 20, 1932 |
| 2,067,781 | Mueller | Jan. 12, 1937 |
| 2,303,726 | Dettloff et al. | Dec. 1, 1942 |
| 2,410,273 | Deubner | Oct. 29, 1946 |
| 2,538,230 | Boggs | Jan. 16, 1951 |
| 2,728,283 | Oswalt | Dec. 27, 1955 |

FOREIGN PATENTS

| | | |
|---|---|---|
| 151,346 | Australia | May 11, 1953 |